United States Patent
McClellan

(10) Patent No.: US 9,876,516 B2
(45) Date of Patent: Jan. 23, 2018

(54) SUPPRESSION OF INTERFERENCE IN POWER AND COMMUNICATIONS SIGNALS

(75) Inventor: Stan McClellan, Manchaca, TX (US)

(73) Assignee: Texas State University—San Marcos, San Marcos, TX (US)

( * ) Notice: Subject to any disclaimer, the term of this patent is extended or adjusted under 35 U.S.C. 154(b) by 0 days.

(21) Appl. No.: 14/419,152

(22) PCT Filed: Aug. 2, 2012

(86) PCT No.: PCT/US2012/049296
§ 371 (c)(1),
(2), (4) Date: Oct. 29, 2015

(87) PCT Pub. No.: WO2014/021895
PCT Pub. Date: Feb. 6, 2014

(65) Prior Publication Data
US 2016/0049988 A1 Feb. 18, 2016

(51) Int. Cl.
*H04B 3/54* (2006.01)
*H04B 3/06* (2006.01)
*H04B 3/30* (2006.01)
*H04B 1/04* (2006.01)

(52) U.S. Cl.
CPC .............. *H04B 1/0475* (2013.01); *H04B 3/06* (2013.01); *H04B 3/30* (2013.01); *H04B 3/54* (2013.01); *H04B 2203/5425* (2013.01)

(58) Field of Classification Search
CPC .. H04B 3/54; H04B 3/542; H04B 2203/5462; H04B 2203/5495; H04B 2203/5425; H04B 1/62; H04B 3/04; H04B 3/06; H04B 3/30; H04B 1/0475; H04L 25/08; H04L 25/085

USPC ........... 375/257, 296; 455/63.1, 114.2, 114.3
See application file for complete search history.

(56) References Cited

U.S. PATENT DOCUMENTS

| | | | |
|---|---|---|---|
| 5,911,115 A | * | 6/1999 | Nair ...................... H04W 28/18 375/296 |
| 6,961,373 B2 | | 11/2005 | Jones |
| 7,113,491 B2 | | 9/2006 | Graziano et al. |
| 7,352,687 B2 | | 4/2008 | Jones et al. |
| 7,567,666 B2 | | 7/2009 | Zimmerman et al. |
| 7,834,643 B2 | * | 11/2010 | Yohanan ............... H02J 3/1842 323/205 |
| 7,948,862 B2 | | 5/2011 | Parnaby |
| 2009/0307540 A1 | * | 12/2009 | Razazian ............... H04B 3/143 375/257 |

(Continued)

FOREIGN PATENT DOCUMENTS

WO 2004/054117 6/2011

OTHER PUBLICATIONS

Nelder et al. "A simplex method for function minimization," Computer Journal, vol. 7, pp. 308-313, 1965.

(Continued)

*Primary Examiner* — Betsy Deppe
(74) *Attorney, Agent, or Firm* — Meyertons, Hood, Kivlin, Kowert & Goetzel, P.C.; Mark R. DuLuca

(57) ABSTRACT

A method of suppressing interference in a communication sent over a channel includes assessing characteristics of channel-induced distortion in a channel, and applying pre-distortion to a signal sent over the channel. The pre-distortion is based on the assessed characteristics of the channel-induced distortion.

29 Claims, 10 Drawing Sheets

(56) References Cited

U.S. PATENT DOCUMENTS

| | | | |
|---|---|---|---|
| 2010/0159855 A1* | 6/2010 | Hardacker | H04B 1/0475 |
| | | | 455/114.3 |
| 2010/0187914 A1 | 7/2010 | Rada et al. | |
| 2010/0283540 A1 | 11/2010 | Davis | |
| 2010/0322364 A1 | 12/2010 | Bogdan | |
| 2011/0075754 A1 | 3/2011 | Smith | |
| 2011/0163806 A1 | 7/2011 | Hongo | |
| 2012/0207229 A1* | 8/2012 | Ananthaswamy | H04L 27/367 |
| | | | 375/296 |

OTHER PUBLICATIONS

International Search Report/Written Opinion for PCT Application No. PCT/US2012/049296 dated Mar. 4, 2013.
International Preliminary Report on Patentability dated Feb. 3, 2015.

* cited by examiner

SUPPRESSION OF INTERFERENCE IN POWER AND COMMUNICATIONS SIGNALS

BACKGROUND

Field

This invention relates to handling interference in power and communications systems. More particularly, the invention relates to methods and systems for suppressing interference in communication signals and power signals transmitted over electrical power lines.

Description of the Related Art

Electrical power lines are sometimes used to carry signals and data in addition to electrical power. A power line communication (PLC) system, for example, may allow end-user devices and utilities to transmit data and enable devices to respond to commands. One application for power line communication is in a "smart grid". The term "smart grid" may be used to refer to a control system that integrates digital computing and communication technologies and services with the power-delivery infrastructure, such as contemplated in the Energy Independence and Security Act of 2007.

Power line communications, such as those used in smart grid applications, may not function properly if reliable communications are not available among users (for example, among grid operators, utilities, end users, and electrical devices). Utilities increasingly require improved communications methods & technologies to collect data and computing power and software to visualize and control grid operations in real time.

One problem that may be encountered in PLC systems is interference. A low-frequency power line channel tends to be a harsh, complex, reactive environment for any form of communications. The power signal itself (the 60 Hz "fundamental") may produce a form of distortion that is problematic for secondary signals (such as communication signals) which are introduced into the channel. For example, the reactive nature of the channel, combined with the relative heft of the primary stimulus (the fundamental, or the power signal itself), may produce a form of channel-initiated modulation which may have a detrimental effect on such secondary communication signals. This channel-initiated modulation may express itself in the combined channel (containing the power signal, the communication signal, and other noise) as a form of noise which is time-synchronous with (or "coherent with") the power signal and which affects all signals in the channel. This time-synchronous or coherent noise may also be referred to as "images" or "ghosts" or "side lobes". The coherent noise may be perceived as a recursive replication of the original communication signal, a recursive replication of some component of the original communication signal, or periodically recurring energy which distorts the communication signal. Image signals may be particularly problematic for communications scenarios which rely on multiple closely spaced, narrowband subcarriers (for example, narrowband frequency division modulation or similar approaches).

Transmission of data via an active power line is a difficult task. Among other things, the pre-existing power signal may cause a number of problems in the system. These problems may include pseudo-stationary interference from harmonics of the fundamental, other forms of synchronous noise, or a form of "blowback" into the data transmitter from the fundamental and harmonics, among others. The structure of the power line network may also interact with low frequency secondary signals that are introduced to the network for the purposes of communication. This interaction may appear as a form of amplitude modulation of the communication signal. The amplitude modulation envelope may be time-synchronous or coherent with the fundamental. The distorting amplitude modulation envelope may be imposed on any/all secondary signals in the channel. This type of channel-induced distortion may be problematic for data communications because amplitude modulation tends to create a proliferation of harmonically-related images of the communication signal or components of the communication signal. As image signals proliferate in the channel, the availability of idle or clear spectrum for additional subcarriers may be drastically reduced, and thus the placement of those subcarriers may become difficult.

SUMMARY

In an embodiment, a method of suppressing interference in a signal sent over a channel includes assessing characteristics of channel-induced modulation in the channel, and applying pre-distortion to the signal sent over the channel. The pre-distortion is based on the assessed characteristics of the channel-induced modulation.

In an embodiment, a system includes a processor and a memory coupled to the processor. The memory program instructions are executable by the processor to implement assessing characteristics of channel-induced modulation in a channel and applying pre-distortion to a signal sent over the channel. The pre-distortion is based on the assessed characteristics of the channel-induced modulation.

In an embodiment, a non-transitory, computer-readable storage medium includes program instructions stored thereon. The program instructions implement assessing characteristics of channel-induced modulation in a channel and applying pre-distortion to a signal sent over the channel. The pre-distortion is based on the assessed characteristics of the channel-induced modulation.

In an embodiment, a method of suppressing interference in a communication sent over a power signal includes assessing characteristics of a power signal in a channel and applying pre-distortion to a communication signal sent over the channel. The pre-distortion is based on the assessed characteristics of the power signal.

In an embodiment, a system includes a processor and a memory coupled to the processor. The memory program instructions are executable by the processor to implement assessing characteristics of a power signal in a channel and applying pre-distortion to a communication signal sent over the channel. The pre-distortion is based on the assessed characteristics of the power signal.

In an embodiment, a non-transitory, computer-readable storage medium includes program instructions stored thereon. The program instructions implement assessing characteristics of a power signal in a channel and applying pre-distortion to a communication signal sent over the channel. The pre-distortion is based on the assessed characteristics of the power signal.

In an embodiment, a method of transmitting power includes assessing characteristics of channel-induced modulation in a power signal, and applying pre-distortion to the power signal to condition the power signal. The pre-distortion is based on the assessed characteristics of the channel-induced modulation.

In an embodiment, an electrical power system includes one or more electrical power sources that supply electrical power, and one or more electrical power lines that transmit electrical power from the electrical power source to one or more loads, a processor, and a memory coupled to the processor. The memory comprise programs instructions executable to implement assessing characteristics of channel-induced modulation in a power signal, and applying pre-distortion to the power signal to condition the power signal. The pre-distortion is based on the assessed characteristics of the channel-induced modulation.

In an embodiment, a non-transitory, computer-readable storage medium includes program instructions stored thereon. The program instructions implement assessing characteristics of channel-induced modulation in a power signal, and applying pre-distortion to the power signal to condition the power signal. The pre-distortion is based on the assessed characteristics of the channel-induced modulation.

Figure 1:
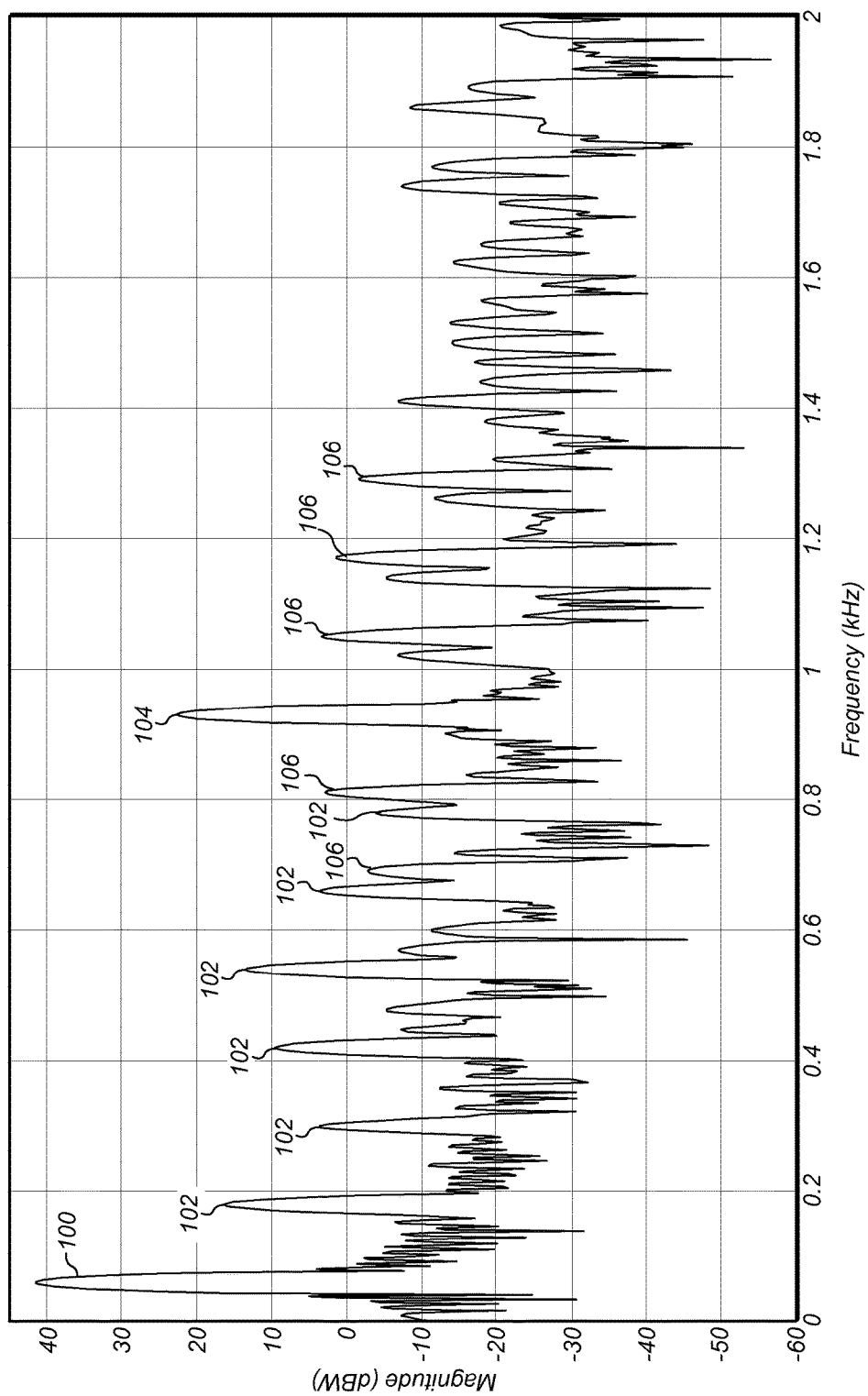
FIG. 1 is a graph illustrating the presence of images in a channel.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, "image" includes any image, replication, ghost, shadow, echo, reflection, copy, or byproduct of an original signal (or a portion of an original signal) introduced into a channel. An image may be, for example, a replication of a signal introduced into a channel for purposes of communication. An image may include changes in magnitude (increases or decreases) in a signal that are, in the aggregate, observable within a range of frequencies. For example, an image may be observable in frequency domain as a notch, spike, or lobe (such as in a plot of magnitude versus frequency for a signal). An image may be harmonically related to one or more elements of the original signal, a fundamental on the channel, or both. For example, in a signal having a fundamental frequency of 60 Hz, images may be observable as lobes at 120 Hz offsets from an 1100 Hz carrier frequency for a communication signal (the offsets in this example being twice the fundamental frequency). An image may be characterized by a smooth rise and fall or a by series or set of irregular rises and falls in a signal.

As used herein, "pre-distortion" means any distortion, modulation, alteration, or modification of a signal before, or at the time, a signal is introduced into a given channel or medium.

As used herein, "real-time", in the context of a system performing a computation for electrical signal transmission or signal processing, includes any computation that occurs while signals are being processed by the system. A real-time update may take perceptible amount of time to be completed, but would not involve, for example, transmission or processing being switched off during a computation.

In some embodiments, signal characteristics of a power line are observed and used to pre-distort communication signals prior to the communication signals' introduction to the power line channel. In one embodiment, suppression is performed in low-frequency, narrowband power line communications.

In some embodiments, time-varying characteristics of signals present in a channel prior to introduction of the communication signal are incorporated into an algorithm to pre-distort the communication signal prior to introduction into the channel. The pre-distortion may compensate for the channel-induced modulation and suppress the apparent modulation. Pre-distortion may produce a cleaner spectral environment after the communication signal is introduced to the channel. In some embodiments, pre-distortion is used to suppress recursively modulated image signals.

In some embodiments, coherent pre-distortion is used to suppress images in a channel which are the result of coherent, channel-initiated modulation. FIG. 1 is a graph illustrating the presence of images in a channel. In this example, a 930 Hz subcarrier is introduced into an active power line channel. The original 60 Hz power signal is shown at 100. Odd harmonics of the 60 Hz power signal are shown at 102. The injected signal of 930 Hz is shown at 104. Harmonic images of the injected signal at a plus or minus 120 Hz harmonic offset are shown at 106.

Figure 2:
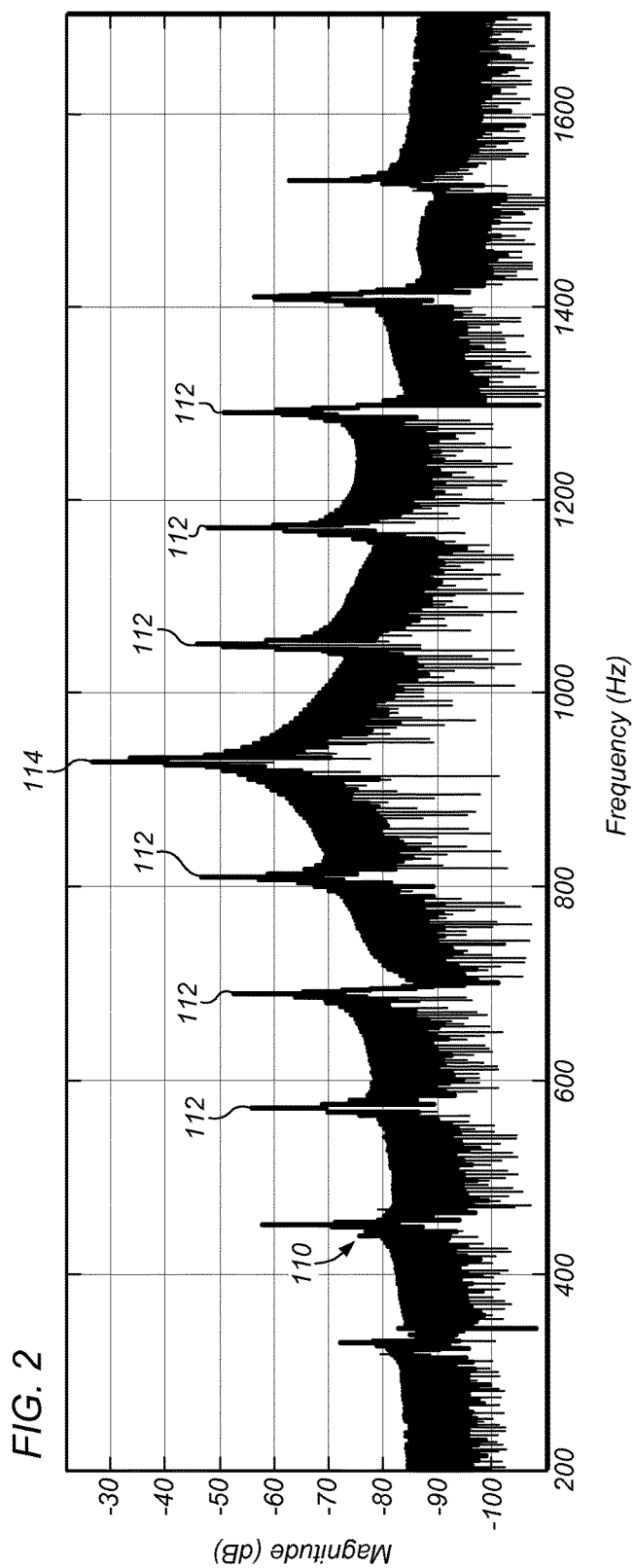
FIG. 2 is a graph of magnitude versus frequency further illustrating images or sidelobes and amplitude modulation of a reactive channel.

FIG. 2 is a graph of magnitude versus frequency further illustrating images or sidelobes and amplitude modulation of a reactive channel. The plots in FIG. 2 represent a comb-filtered version of FIG. 1 (for example, in which filtering has been applied to remove everything except the 930 Hz communication signal and its images). Plot 110 illustrates a short, comb-filtered segment of the 930 Hz pure tone shown in FIG. 1. Side lobes 112 are shown at plus or minus 120 Hz-harmonic offset from injected signal 114.

Figure 3:
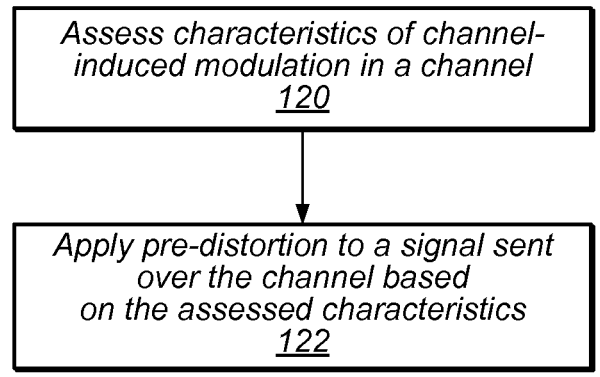
FIG. 3 illustrates one embodiment of applying a pre-distortion to suppress interference in a channel.

In some embodiments, a communication signal in a channel is pre-distorted prior to introduction to the channel to suppress channel-initiated interference from the power line. FIG. 3 illustrates one embodiment of applying a pre-distortion process to suppress interference in a channel. At 120, one or more characteristics of channel-induced modulation in a channel are assessed. The characteristics include one or more images. In some embodiments, the characteristics include voltage of a signal in the channel. In some embodiments, a basis set used within the pre-distortion algorithm is computed in real-time from time-domain samples of the channel power signal and used to create a pre-distortion characteristic which can be applied to the communication signal prior to introduction to the channel.

At 122, pre-distortion is applied to a signal sent over the channel. The pre-distortion may be based on the assessed characteristics of the channel-induced modulation. In one embodiment, a phase-coherent amplitude envelope is determined from characteristics of the power signal, which may include images of the communication signal.

The amplitude envelope may include an inversion based on one or more of the images. The pre-distorted signal may, for example, match and counteract (or, be an "inverse" of) the amplitude distortion that will be induced by the channel. The specific structure of the pre-distortion signal may be estimated from a function of the signals on the channel. In the power channel, the distortion may be phase-synchronous with the fundamental, so the form of the pre-distortion envelope may be derived as a linear combination of powers of the fundamental. Using this approach, the pre-distortion function or "inverse envelope" can be computed instantaneously from observed samples of the fundamental. The method may observe the extant voltage on the power network and, using the formulation of the distortion envelope, compute a pre-distortion function which can be imposed on the communication signal just prior to introduction to the power network. Via this functional structure, a pre-distortion envelope may be a close approximation of the inverse of the amplitude distortion envelope imposed by the power network.

In some embodiments, suppression of interference in a channel includes determining a phase-coherent amplitude envelope. The phase-coherent amplitude envelope may be applied to the communication signal prior to introduction to the channel. The pre-distortion amplitude envelope may be related to the existing (distorted) amplitude envelope. The pre-distortion envelope may be created by observing the idle-channel signal which is already-present in the channel.

Figure 4:
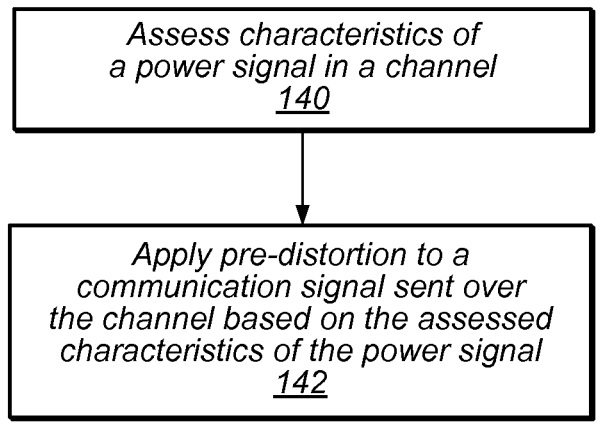
FIG. 4 illustrates one embodiment of interference suppression in power line communications using pre-distortion of a communication signal.

In some embodiments, a communication signal over a power line is pre-distorted to suppress interference in a power line. FIG. 4 illustrates one embodiment of interference suppression in power line communications using pre-distortion of a communication signal. At 140, characteristics of a power signal in a channel are assessed. The power signal may be a signal on a power transmission line from a power utility. The fundamental frequency of the power line may be, for example, 60 Hz.

At 142, pre-distortion may be applied to a communication signal sent over the channel based on the assessed characteristics of the power signal. In one embodiment, the communication includes messages over a smart grid. The amplitude of the pre-distorted signal may be an inversion of the amplitude distortion induced by the power network.

In some embodiments, time-domain samples of the idle-channel signal are transformed to create a basis set. The basis set may be linearly combined to produce the pre-distortion envelope. In one embodiment, the basis set used for the weighted linear combination is a truncated set of odd powers of the power signal itself, including the fundamental, its harmonics, and any noise present on the channel (a "coherent basis"). As a result, the basis set may be neither normalized nor orthogonal, but can be computed instantaneously from time-domain samples of the idle-channel power signal. Any requirement for a secondary phase-locking subsystem may be eliminated.

Coefficients used in the weighted linear combination and the truncation (order) of the sum can be pre-determined statically or updated dynamically. In some embodiments, a forward-adaptive (frame-wise) approach may be used to determine the coefficient and/or the order. In some embodiments, a backward-adaptive (sample-wise) approach may be used to determine the coefficient and/or the order. The coefficients can also be optimized in the spectral domain (for example, using a sinusoidal basis set) and then transformed for use with the coherent basis set using a power reduction formula, or vice versa.

Figure 5:
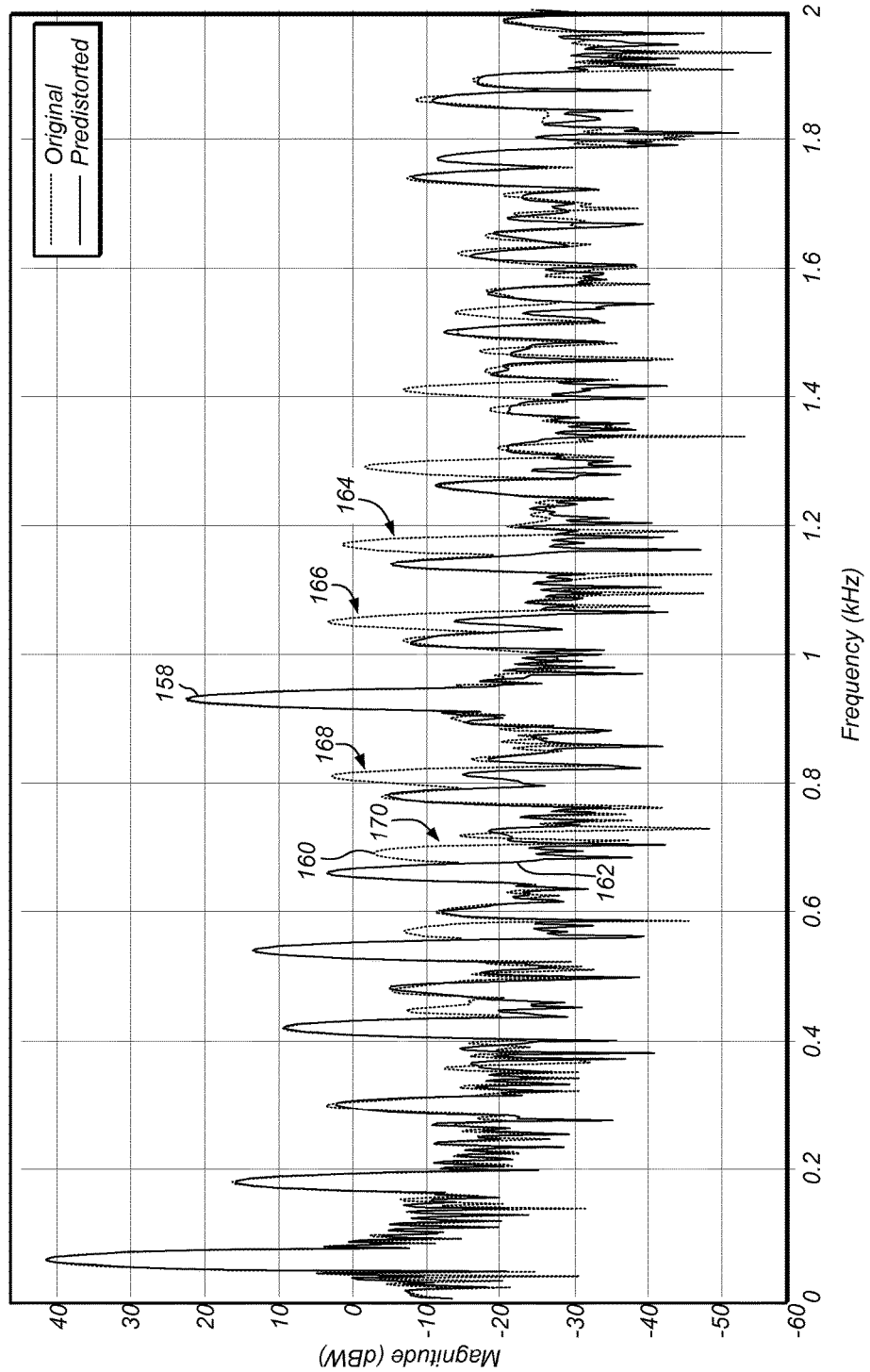
FIG. 5 illustrates effects of pre-distortion in a frequency-domain plot.

FIG. 5 illustrates effects of pre-distortion in a frequency-domain plot. In the example shown in FIG. 5, the counteracting time-domain envelope has been computed from the idle-channel signal and applied to the communication signal prior to introduction to the channel. Plot 160 is a plot with sidelobes of original signal 158 which is a sinusoidal carrier at 930 Hz ($f_c$=930 Hz). Plot 162 is a plot in which sidelobes have been suppressed using pre-distortion. An example of suppression of the side lobes can be seen, for example, around the first image at 166 & 168 ($f_c$±120 Hz). In this case, a pre-distortion gain is roughly 20 dB. This pre-distortion gain is also evident at several other image locations ($f_c$±n*120 Hz), as can be seen in the differential between plot 160 and plot 162 in areas 164, 166, 168, and 170. The spectral envelope of the original communication signal around 930 Hz may be relatively undistorted even after the pre-distortion process and the coherent distortion process (the channel). The lack of distortion is an indicator of efficacy of the pre-distortion process because the communication signal passes into the channel with maximum efficiency while minimizing the distortion due to images or sidelobes, (which occur naturally in this reactive channel).

In some embodiments, a set of basis functions are created from an observation of the fundamental. These basis functions may be combined and used to calculate the pre-distortion envelope, which is then applied to the communication signal. If the set of basis functions and their combination are close enough to the unknown process creating amplitude distortion in the channel, then the two effects will counteract each other, leaving the communication signal in the channel, undistorted. The amplitude modulation induced by the channel may be phase-coherent with the fundamental. Further, the amplitude modulation envelope imposed on any signal in the channel can be estimated by a linear combination of specific functions of the fundamental.

In one mathematical formulation, p(t) or simply, p is a power signal in the time domain with Fourier Transform $P(\xi)=F(p)$. In a perfect channel, p would be simply a sinusoidal power signal with frequency 60 Hz (the fundamental). Otherwise, p is the entire power signal observed in the channel, which is largely sinusoidal but which may contain some harmonic content due to channel-induced distortion.

In this mathematical formulation, s(t) or s may be a communication signal in the time domain with Fourier Transform $S(\xi)=F(s)$. In the simplest case, s might be a sinusoid at some frequency other than 60 Hz. In other cases, s might be a more complex pass-band carrier, modulated via analog or digital means to carry a message signal or data bits. An objective is to transmit communication signal s through the power line system so that the resulting signal can be recovered without error. Unfortunately, during the transmission, the power line system may distort s via an unknown transfer function $H_p$. Due to the nature of the system, the transfer function may not affect the power signal p. In fact, the transfer function $H_p$ may depend on p in some fashion, and the structure of $H_p$ can be partially estimated via observation of p. Since the effect of $H_p$ may be similar to conventional amplitude modulation, appropriate pre-distortion of s via an inverse-function $H_p^{-1}$ may effectively cancel out the effect of the channel, thereby suppressing unwanted noise or spectral artifacts related to the interaction of s, p, and $H_p$. Mathematically, $$H_p(H_p^{-1}(s))=s. \quad (1)$$

In this example, $H_p$ may be unknown and may not be observed effectively. As such, computing $H_p^{-1}$ precisely may not be possible. In some embodiments, the structure of $H_p$ is estimated using odd powers of the fundamental p. This produces the approximation $\hat{H}_p^{-1}$, so that Equation 1 becomes $$H_p(\hat{H}_p^{-1}(s))=\hat{s} \approx s. \quad (2)$$

By choosing the estimated structure of $\hat{H}_p$ carefully (for example, modeling), any errors contained in the approximation of $H_p$ can be reduced arbitrarily. Examples of methods that may be used, in some embodiments, are described in J. Nelder and R. Mead, "A simplex method for function minimization," Computer Journal, vol. 7, pp. 308-313, 1965; R. Fletcher, Practical Methods of Optimization. New York, N.Y.: Wiley, 1987; and H. Matthies and G. Strang, "The solution of non-linear finite element equations," Int. J. Num. Methods in Engr., vol. 14, pp. 1613-1626, 1979.

Figure 6:
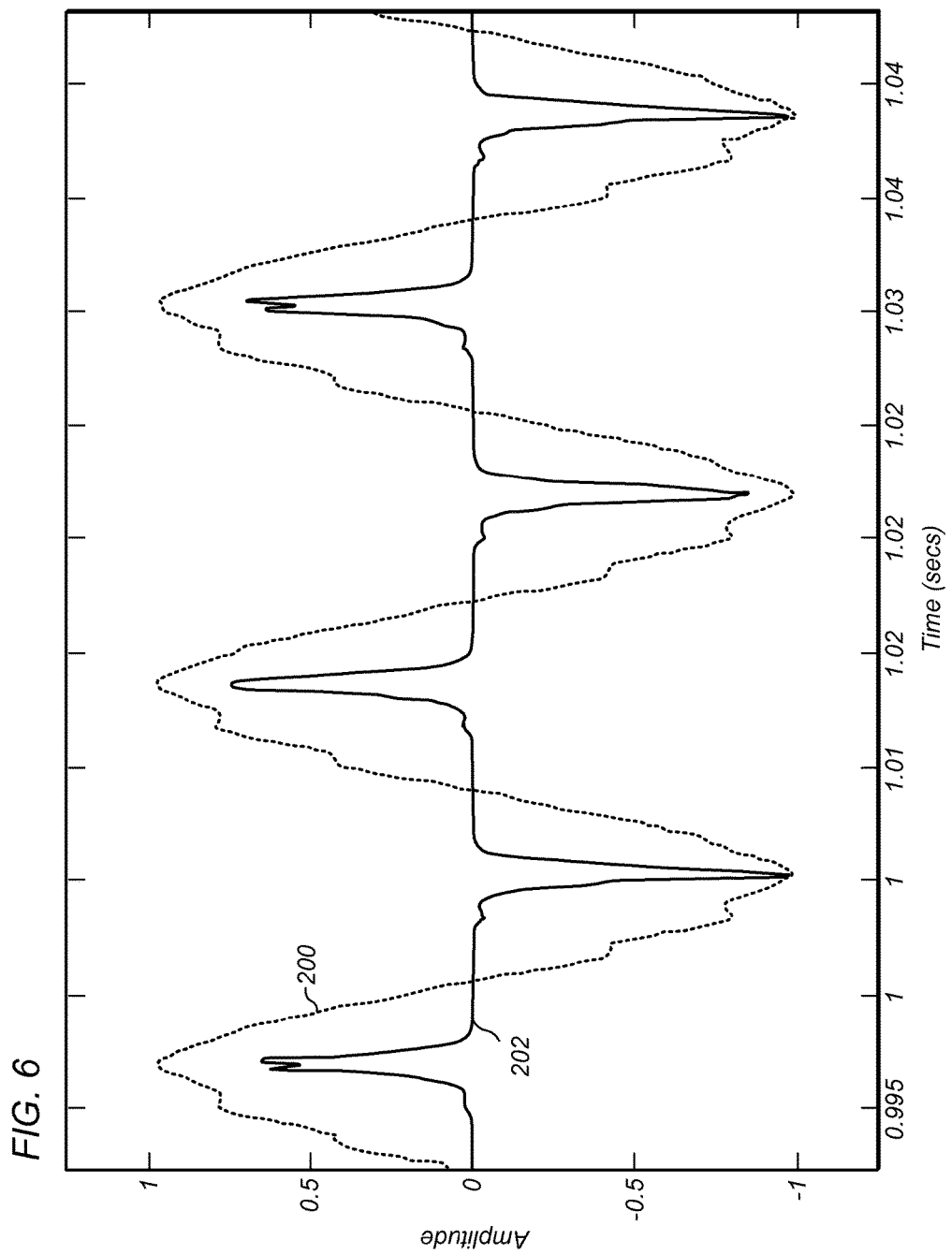
FIG. 6 illustrates a power signal and a coherent amplitude modulation based on the power signal.

Although it may not be possible to model $H_p$, the channel may produce a coherent amplitude modulation of secondary signals such as s. This coherent amplitude modulation can be partially modeled using a linear combination of $p^j$, or $$q(t, \alpha) = \sum_{j=0}^{N} \alpha_j [p(t)]^{2j+1}, \quad (3)$$

where coefficients $\alpha=(\alpha_1, \ldots, \alpha_n)^T$ are initially unknown and may be optimized for each instance of the channel, or re-optimized over time. In Equation (3), q(t) is composed using the basis set which is odd powers of the signal p(t). The model q(t) can equivalently be composed using a basis set which is even powers of p(t) or a combination of odd and even powers of p(t). A representative p(t) and q(t) are shown in FIG. 6, where q(t) is constructed using the odd-power basis set only. Plot 200 represents p and plot 202 represents q. In this example, the coefficients were estimated manually. In FIG. 6, both p and q are normalized to unit amplitude.

The channel may construct a "false message" which is imposed on communication signal s as it transits the channel. The unknown transfer function $H_p$ may be used to represent the false message signal. Estimating $H_p$ via q may provide a constructive relationship given by:

$$\hat{H}_p(t,\alpha)=-|q(t)|+\delta. \quad (4)$$

Figure 7:
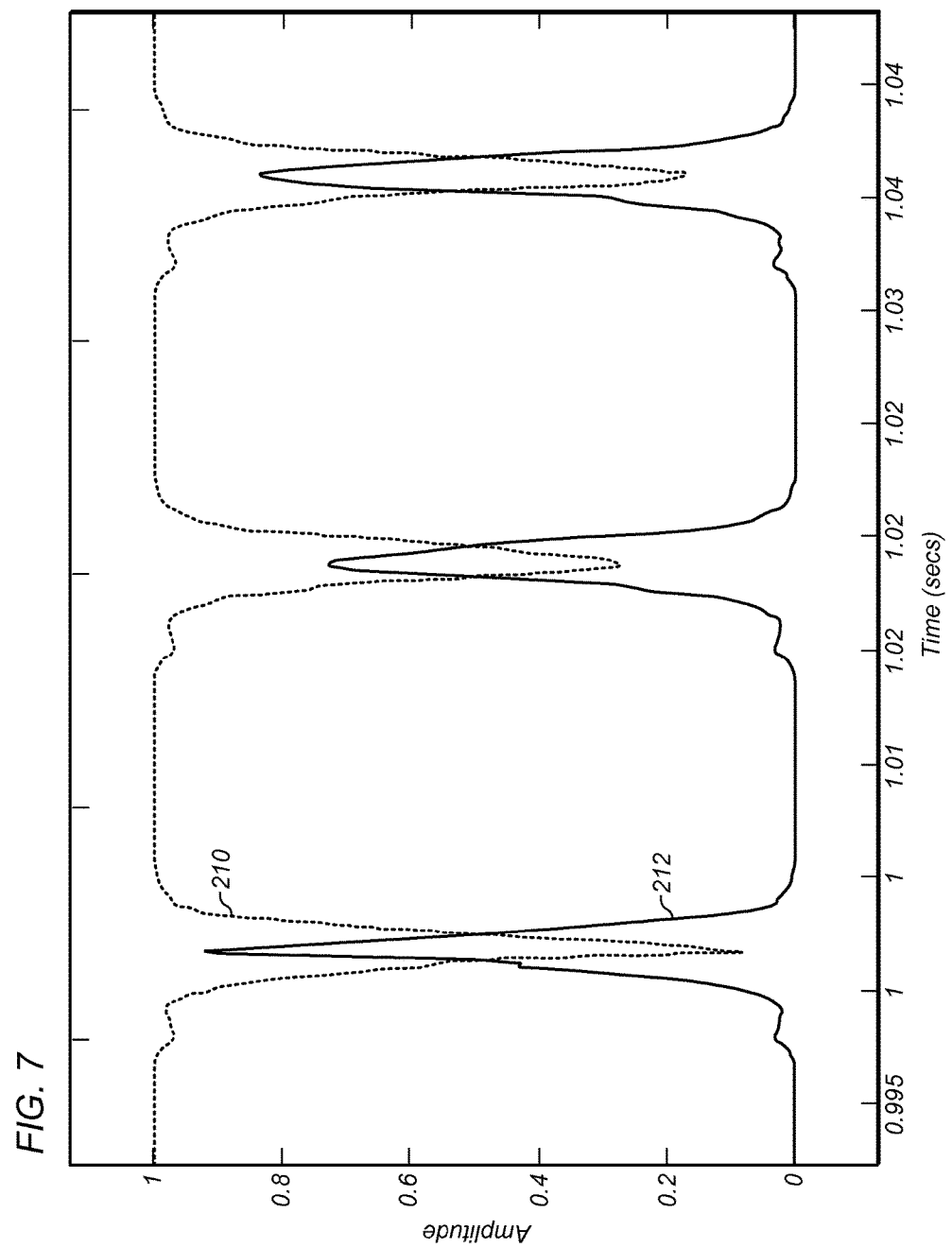
FIG. 7 illustrates an estimated channel modulation envelope and a corresponding pre-distortion envelope.

In Equation 4, the real "false message" $H_p$ is estimated by $\hat{H}_p$, which depends on q through coefficients $\alpha$. The "false message" can be counteracted by pre-distorting s with $\hat{H}_p^{-1}$. All envelope functions may be normalized to unit amplitude prior to use. In Equation 4, $\delta$ is a constant related to the modulation depth, as is customary for amplitude modulation envelopes. A representative $H_p$ estimated from an actual power signal p(t) is shown in FIG. 7. In FIG. 7, an estimated channel module envelope $H_p$ is represented by plot 210 and a corresponding pre-distortion envelope is represented by plot 212. The signals are shown normalized to unit amplitude, and have not been scaled for correct modulation depth (i.e., $\delta=0$).

Figure 8:
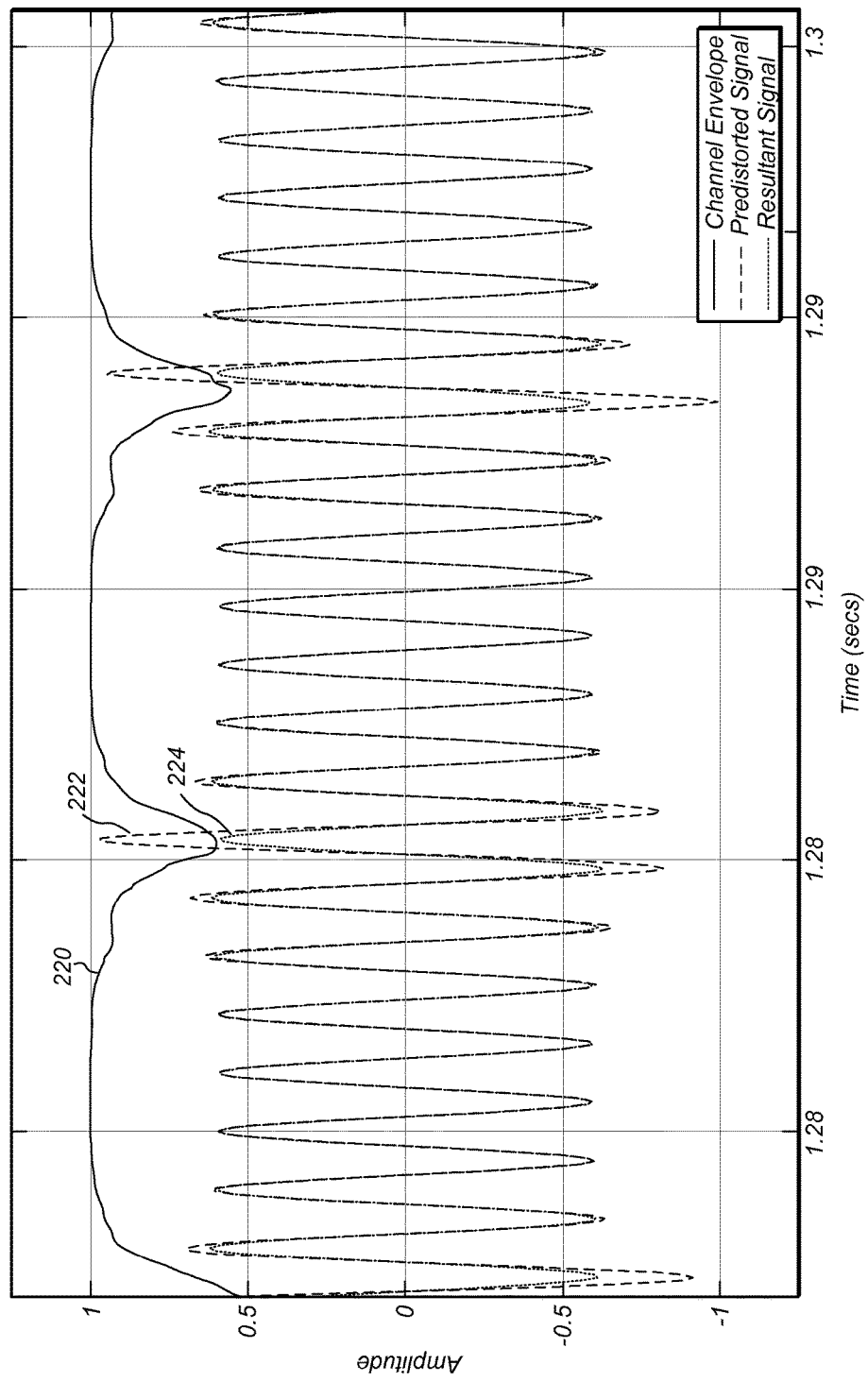
FIG. 8 illustrates effects of applying pre-distortion to counteract channel effects.

An envelope corresponding to a transmitted (distorted) signal $H_p(s)=s_H$ that has been modulated by the channel is represented as plot 220 of FIG. 8. In this example, the communication signal s may be a low-rate BPSK-modulated sinusoidal carrier with frequency of roughly 900 Hz.

In FIG. 8, subtle amplitude modulation effects of $H_p$ on s may be seen. The amplitude envelope of $s_H$, which is due to $H_p$, has notches that may be coherent with the peaks of the fundamental p. In some embodiments, time-domain artifacts are implicitly modeled by q (and hence $\hat{H}_p$). Thus, the envelope can be translated to an optimized pre-distortion implementation that does not require complex feedback loops or phase discrimination/locking techniques.

In some embodiments, the modulation imposed by the channel via $H_p$ is pre-distorted by an inverse function. The pre-distortion approach may involve estimating and optimizing the coefficients of q and then formulating an "estimated false message" signal $\hat{H}_p$, which can be applied to s prior to introduction to the channel as $\hat{H}_p^{-1}(s)$. Upon introduction to the channel, the channel transfer function may re-impose the "false message" $H_p$ onto the pre-distorted signal. In this fashion, the distortion due to the channel can be moderated as in Equation 2, subject to the fidelity of q, $\alpha$, and hence $\hat{H}_p$. A representative graph of the outcome of this process is shown in FIG. 8. In FIG. 8, plot 220 represents a channel envelope corresponding to the channel-induced modulation of signal $H_p(s)$. Plot 222 represents a pre-distorted signal $\hat{H}_p^{-1}(s)$ introduced into the channel. Plot 224 represents a resulting suppressed signal $\hat{s}$. The relatively uniform amplitude of in the resultant signal indicates the effectiveness of the pre-distorted signal in counteracting the channel effects seen in plot 220 of the channel envelope.

The pre-distortion envelope $\hat{H}_p^{-1}$ and the coefficients $\alpha$ may be optimized so that $\hat{s} \sim s$. When $\hat{H}_p = H_p$ exactly, the communication signal s will be transmitted through channel undistorted. As mentioned previously, the form of $H_p$ may need to be estimated via, for example, the coefficients of q.

The pre-distortion envelope $\hat{H}_p^{-1}$ may be used in a "double sideband" amplitude modulation scenario, and normalized to unit amplitude before use. In one example, a formulaic representation of $\hat{H}_p^{-1}$ is:

$$\hat{H}_p^{-1}(t, \alpha) = \frac{[q(t)]+\varepsilon}{MAX(\cdot)}, \quad (5)$$

where $\alpha=(\alpha_1, \ldots, \alpha_n)^T$, $\epsilon>0$, and MAX(.) is the maximum value of the numerator to ensure unity amplitude. A representative envelope is shown in FIG. 7 at plot 212, and the effect of applying the envelope to a communication signal s is shown in FIG. 8, plot 224.

In the example shown in FIG. 8, the coefficients $\alpha$ may be estimated manually. However, even with non-optimal coefficients, the fidelity of the pre-distortion process which suppresses the unwanted image energy via an estimate of $H_p$ in this example may be relatively effective, as illustrated in plot 224 in FIG. 8 ($\hat{s}$) and the spectral plot in FIG. 5. Estimation and inversion of the "false message" includes performing an optimization that depends on a set of coefficients $\alpha$. Any suitable approach may be used for optimizing coefficients of this form. In some instances, the signal p may change slowly over time. In these cases, the introduction of a windowed or framed approach may be optimal.

Referring again to FIG. 8, the effect of the coherent, channel induced distortion is represented in the amplitude envelope of plot 220, and the pre-distorted signal fed to the channel is represented by plot 222, and resulting suppressed signal is represented by plot 224. The notches in the amplitude of $H_p(s)$ may be phase-coherent with the peaks of p. In plot 222, the corresponding inverse amplitude modulation of s due to $\hat{H}_p^{-1}$ is seen. The peaks in the amplitude of $\hat{H}_p^{-1}(s)$ may be phase-coherent with the peaks of p, and hence are also phase-coherent with the notches in $H_p(s)$. These time-domain artifacts may be accurately modeled by q and hence $\hat{H}_p^{-1}(s)$.

The effect of this process is illustrated in FIG. 5 where the original spectrum of the power line channel is displayed using a dotted line, and the pre-distorted spectrum is displayed using a solid line. In the figure, a low-rate BPSK signal s is introduced to the channel with a carrier frequency near 900 Hz. When the pre-distortion scheme is not used (dotted line), the images or "sidelobes" of the introduced signal are clearly evident at 120 Hz harmonic offsets from the carrier. However, when the pre-distortion scheme is used, the images of s have been suppressed significantly (solid line). In this case, the differential distortion between the original communication signal s and the post-received, pre-distorted signal ŝ is approximately 0.7 dB. Two areas which may be further optimized in some embodiments include: (a) spurious peaks at distant 120 Hz harmonic offsets from the 900 Hz carrier, and (b) a slowly varying spectral envelope.

In certain embodiments, a near-field suppression approach as described herein is used in which coefficients are continuously re-optimized. Near-field suppression as described herein may be used, in certain embodiments, in transmissions schemes that rely on large numbers of "thin" carriers, such as frequency-division modulation (FDM) or computationally efficient equivalent approaches based on transforms, such as orthogonal FDM (OFDM).

Figure 9:
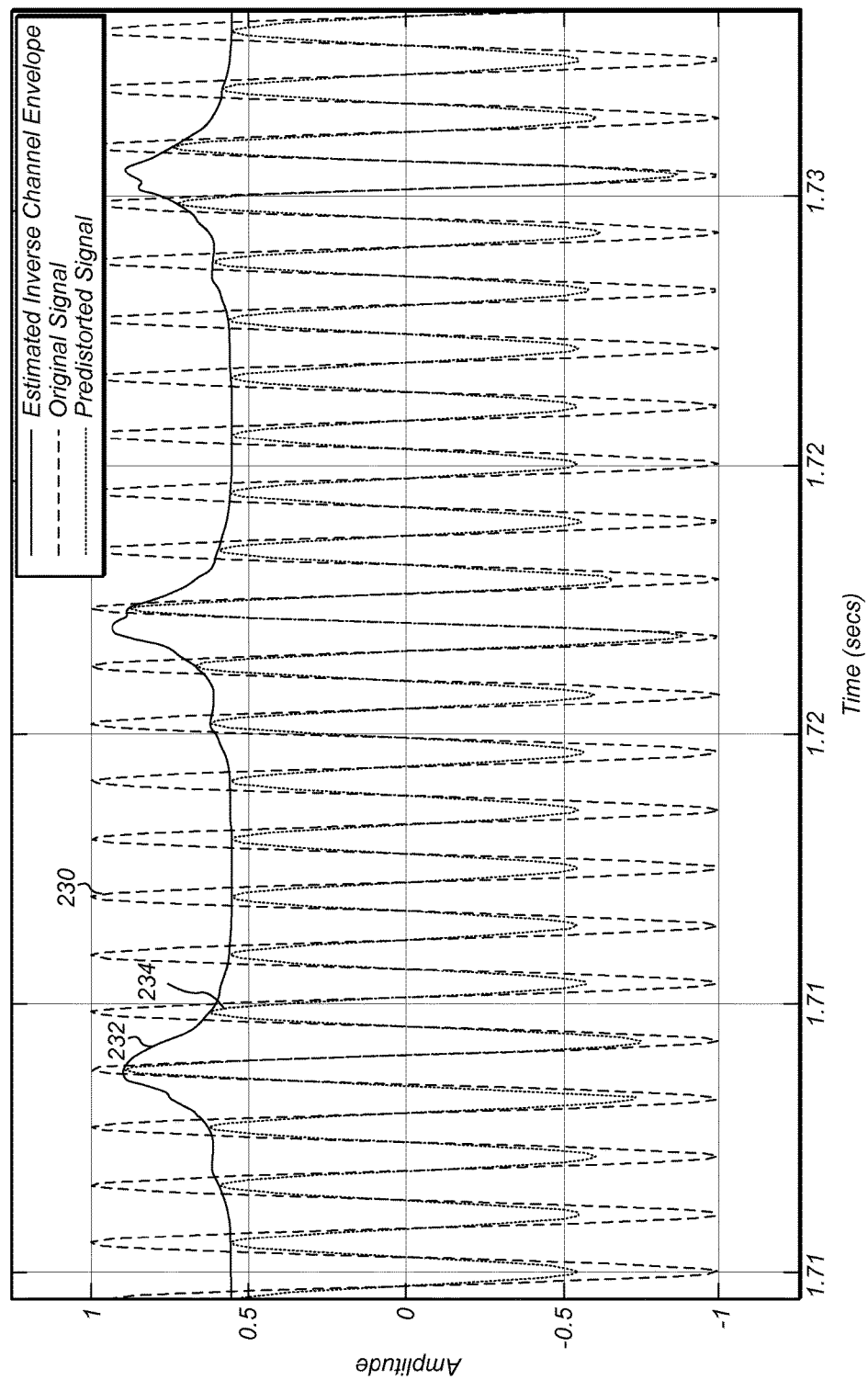
FIG. 9 illustrates signals prior to introduction into a channel in one embodiment.

FIG. 9 illustrates signals prior to introduction into a channel according to one embodiment. Plot 230 represents an original signal before pre-distortion. Plot 232 represents an estimated inverse channel envelope. Plot 232 may correspond to, for example, an inversion of the channel envelope represented by plot 220 shown in FIG. 8. Plot 234 represents a pre-distorted signal. The pre-distorted signal of plot 234 may be generated by applying the inverse channel envelope of plot 232 to the original signal of plot 230.

For illustrative purposes, an example set of coefficients that may be used to generate a pre-distortion envelope is set forth in Table 1.

In certain embodiments, the process of formulating a set of coefficients and truncating the approximation involves using unity-valued coefficients for the first N, and the remainder coefficients zero-valued.

Figure 10:
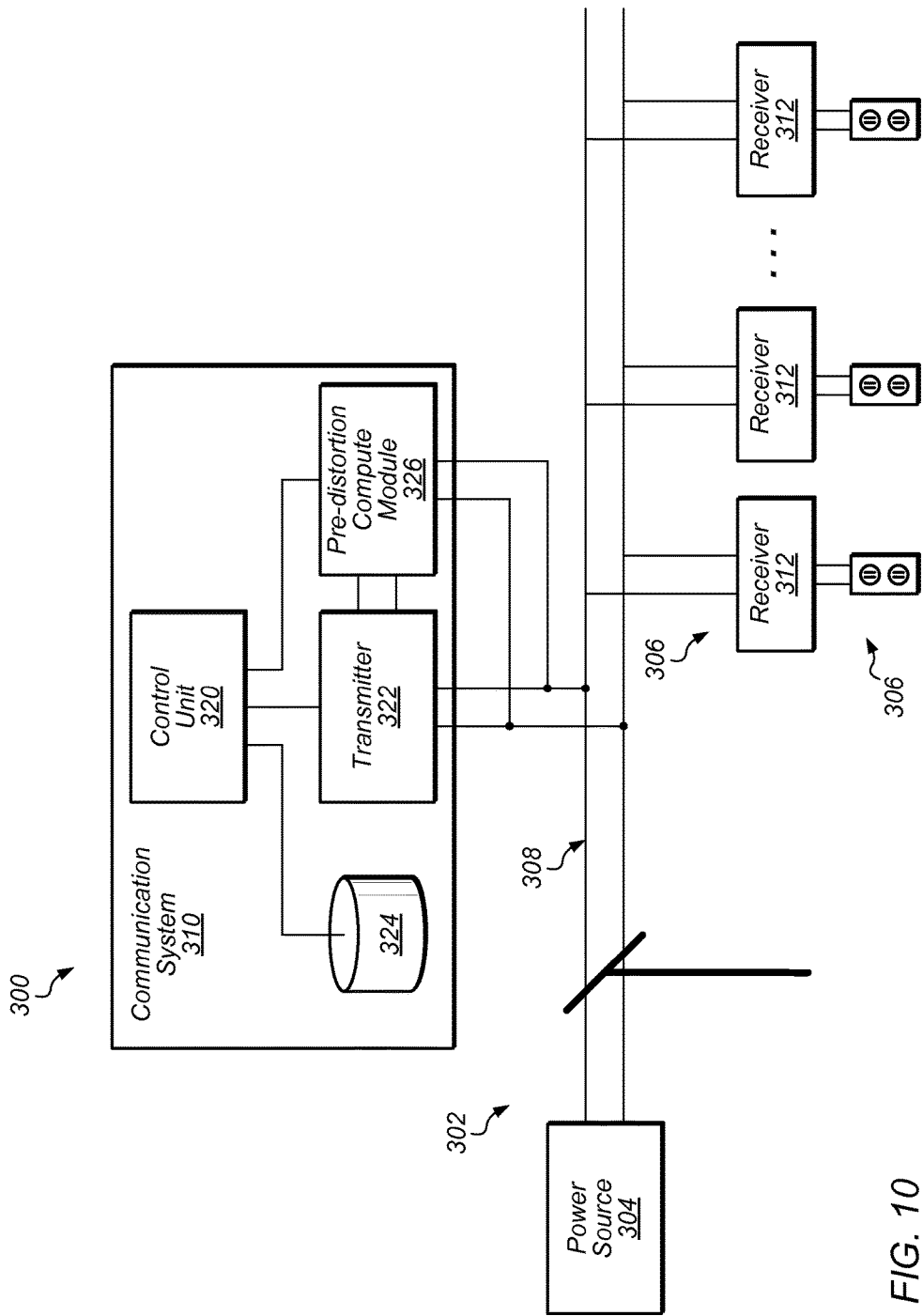
FIG. 10 illustrates one embodiment of a power system that includes a system for applying pre-distortion to power signals.

FIG. 10 illustrates one embodiment of a power system that includes a system for applying pre-distortion to power signals. System 300 includes power source 304 and user systems 306. Power source 304 may produce electrical power and supply it to user systems 306 by way of power transmission lines 308. Power source 304 may be, for example, a utility power plant. Communication system 310 may introduce signals onto power transmission lines 308. Communication system may transmit signals over power lines 308 to receivers 312 in user systems 306. In certain embodiments, receivers can be embedded in devices owned by the utility company, or which are part of the grid infrastructure (for example, instead of, or addition to, those in"user systems").

Communication system 310 includes control unit 320, transmitter 322, data storage device 324, and pre-distortion compute module 326. Control unit 320 may access and store data on data storage device 324. Control unit 320 may control transmitter 322 to generate communication signals over power lines 308.

Pre-distortion compute module 326 may sense power signals carried over power transmission lines 308. Control unit 320 may control pre-distortion compute module 326 to compute envelopes for generating pre-distortion to be applied to signals from transmitter 322.

In the system illustrated in FIG. 10, communication system 310 is described for illustrative purposes as only sending communication signals, and receivers 312 are described as only receiving signals. In some embodiments, nevertheless, some or all of the devices in a network may both send and receive communications signals over power lines. In some embodiments, devices in a smart grid use pre-distortion as described herein to suppress interference in communication signals sent over power lines.

Figure 11:
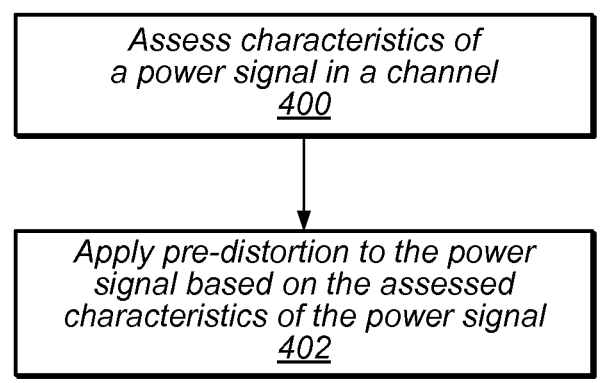
FIG. 11 illustrates one embodiment of interference suppression to condition power.

In some embodiments, a power signal transmitted over a power line is pre-distorted to condition the power being transmitted. FIG. 11 illustrates one embodiment of interference suppression to condition power. At 400, characteristics of a power signal in a channel are assessed. The power signal may be a signal on a power transmission line from a power utility. The fundamental frequency of the power line may be, for example, 60 Hz.

At 402, pre-distortion may be applied to the power signal to condition the power signal based on the assessed characteristics of the power signal. Conditioning may improve

TABLE 1

| N | alpha(1) | alpha(2) | alpha(3) | alpha(4) | alpha(5) | alpha(6) | alpha(7) |
|---|----------|----------|----------|----------|----------|----------|----------|
| 1 | 1 | | | | | | |
| 2 | 1.0e−06* (−0.2267354 74435443) | 1.0e−06* (−0.33701498 5986362) | | | | | |
| 3 | −0.0000289 98013682 | 0.00008906 8579453 | 0.00169273 3301065 | | | | |
| 4 | 0.0319640 17187134 | 0.01899495 9890008 | 0.01251511 7498110 | 0.01496078 8673542 | | | |
| 5 | −0.0293630 96903303 | 0.05841419 6420801 | 0.00585579 6233263 | −0.03138356 7947181 | 0.03792582 4459968 | | |
| 6 | 0.0551020 39334367 | −0.15770467 0758027 | 0.39724956 2827227 | −0.48277577 5931498 | 0.23433627 3787741 | 0.00135230 7313303 | |
| 7 | 0.0358386 51996427 | −0.11940271 4503254 | 0.25919593 4681300 | −0.25935201 4188269 | 0.06605608 7457890 | 0.04322283 2780858 | −0.22336 6530973 619 | the quality of power being transmitted to various electrical loads. In some embodiments, the pre-distorted signal is an inversion of the amplitude distortion induced by the power network.

Pre-distortion of signals as described above may provide enhanced Power Line Communications (PLC) capability by suppression of power line signal interference, thus enabling more efficient and reliable use of the power line for additional communication signals, such as for smart grid applications. Within the context of the smart grid market, this technology would be considered a Smart Grid-Enabling Technology, targeting the integrated communications segment, specifically enabling enhanced power line communication Applications that may implement image suppression using pre-distortion, in various embodiments, include energy management systems (residential, commercial, or industrial), smart metering applications, manufacturing (for example, semiconductor manufacturing), and home area network (including, for example, enhanced communication with smart appliances in the home). Other applications that may implement image suppression using pre-distortion include, in various embodiments, electric vehicle (EV) charging applications. Examples include remote monitoring of EV charging and automated load balancing to enable efficient EV charging.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computing systems may be operable to execute the computer programs to implement computer-implemented systems and methods. A computer system may allow access to users by way of any browser or operating system.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of suppressing interference in a communication sent over a channel, comprising:
    assessing one or more characteristics of channel-induced distortion in a channel, wherein assessing one or more characteristics of channel-induced distortion in a channel comprises:
        sampling an idle-channel signal; and
        modeling the channel-induced distortion in the channel based on the samples of the idle-channel signal, wherein the channel-induced distortion comprises an amplitude modulation envelope that is time-synchronous with another signal in the channel; and
    applying pre-distortion to a signal sent over the channel, wherein the pre-distortion is based on at least one of the assessed characteristics of the channel-induced distortion.

2. The method of claim 1, wherein the applied pre-distortion suppresses one or more images in the channel.

3. The method of claim 2, wherein at least one of the suppressed images is harmonically related to another signal in the channel.

4. The method of claim 2, wherein at least one of the suppressed images is a replica of a secondary signal in the channel.

5. The method of claim 1, wherein the applied pre-distortion at least partially counteracts the channel-induced distortion.

6. The method of claim 1,
wherein applying the pre-distortion to the signal sent over the channel comprises applying a pre-distortion envelope, wherein the pre-distortion envelope is or approximates an inverse of the amplitude modulation envelope associated with the channel-induced distortion.

7. The method of claim 1, wherein modeling the channel-induced distortion in the channel further comprises:
determining one or more sets of basis functions which are based on samples of the idle-channel signal, and determining a pre-distortion amplitude envelope by combining the elements of one or more sets of basis functions.

8. The method of claim 7, wherein the channel is a power line channel, and wherein the idle-channel signal is a power signal.

9. The method of claim 7, wherein the one or more sets of basis functions is constructed from samples of the idle-channel signal and one or more functions of the idle-channel signal.

10. The method of claim 9, wherein the one or more functions comprise only odd exponents.

11. The method of claim 9, wherein the one or more functions comprise only even exponents.

12. The method of claim 9, wherein the one or more functions comprise a combination of odd and even exponents.

13. The method of claim 7, wherein the one or more sets of basis functions is computed instantaneously from one or more of the time-domain samples of an idle- channel power signal.

14. The method of claim 7, wherein determining the pre-distortion amplitude envelope comprises statically determining a truncation of the one or more sets of basis functions or at least one set of coefficients.

15. The method of claim 7, wherein determining the pre-distortion amplitude envelope comprises dynamically determining a truncation of the one or more sets of basis functions or at least one set of coefficients.

16. The method of claim 7, wherein coefficients of the one or more sets of basis functions are periodically re-optimized.

17. The method of claim 7, wherein applying pre-distortion to a signal sent over the channel comprises optimizing one or more coefficients in the spectral domain and translating the coefficients between the spectral-domain and the time-domain for efficient implementation.

18. The method of claim 1, wherein the channel is a power line channel, wherein the signal is a communication signal on the power line channel, and
wherein the pre-distortion applied to the communication signal is based on at least one assessed characteristic of a power signal in the power line channel.

19. The method of claim 18, wherein the applied pre-distortion suppresses at least one image that is harmonically related to the power signal or the communication signal.

20. The method of claim 18, wherein applying pre-distortion to a signal sent over the channel comprises applying pre-distortion to at least one smart grid message sent over the channel.

21. A system, comprising:
a processor;
a memory coupled to the processor, wherein the memory comprises program instructions executable by the processor to implement:
assessing one or more characteristics of channel-induced distortion in a channel, comprising:
sampling an idle-channel signal; and
modeling the channel-induced distortion in the channel based on the samples of the idle-channel signal, wherein the channel-induced distortion comprises an amplitude modulation envelope that is time-synchronous with another signal in the channel; and
applying pre-distortion to a signal sent over the channel, wherein the pre-distortion is based on at least one of the assessed characteristics of the channel-induced distortion.

22. A non-transitory, computer-readable storage medium comprising program instructions stored thereon, wherein the program instructions are configured to implement:
assessing one or more characteristics of channel-induced distortion in a channel, comprising:
sampling an idle-channel signal; and
modeling the channel-induced distortion in the channel based on the samples of the idle-channel signal, wherein the channel-induced distortion comprises an amplitude modulation envelope that is time-synchronous with another signal in the channel; and
applying pre-distortion to a signal sent over the channel, wherein the pre-distortion is based on at least one of the assessed characteristics of the channel-induced distortion.

23. A method of transmitting power, comprising:
providing power to one or more user systems from a power source through power transmission lines;
introducing one or more power signals into the power transmission lines;
assessing one or more characteristics of channel-induced distortion in a power signal, wherein assessing at least one of the characteristics comprises determining an amplitude modulation envelope associated with the channel-induced distortion;
applying pre-distortion to a communication signal subsequently introduced into a communication channel, wherein the pre-distortion is based on at least one of the assessed characteristics of the channel-induced distortion in the power signal.

24. The method of claim 23, wherein the applied pre-distortion suppresses one or more images in the channel.

25. The method of claim 23, wherein assessing one or more characteristics of channel-induced distortion in a channel further comprises:
sampling an idle-channel signal; and
modeling the channel-induced distortion in the channel based on the samples of the idle-channel signal.

26. The method of claim 23, wherein applying pre-distortion comprises applying a pre-distortion envelope, wherein the pre-distortion envelope is or approximates an inverse of the amplitude modulation envelope associated with the channel-induced distortion.

27. The method of claim 23, wherein applying pre-distortion comprises suppressing one or more harmonics in the power signal.

28. An electrical power system, comprising:
one or more electrical power sources configured supply electrical power;
one or more electrical power lines configured to transmit electrical power from the electrical power source to one or more loads;
a processor; and
a memory coupled to the processor, wherein the memory comprises program instructions executable by the processor to implement:

assessing one or more characteristics of channel-induced distortion in a power signal, wherein assessing at least one of the characteristics comprises determining an amplitude modulation envelope associated with the channel-induced distortion;

applying pre-distortion to a communication signal subsequently introduced into a communication channel, wherein the pre-distortion is based on at least one of the assessed characteristics of the channel-induced distortion in the power signal.

29. A non-transitory, computer-readable storage medium comprising program instructions stored thereon, wherein the program instructions are configured to implement:

assessing one or more characteristics of channel-induced distortion in a power signal, wherein assessing at least one of the characteristics comprises determining an amplitude modulation envelope associated with the channel-induced distortion; and applying pre-distortion to a communication signal subsequently introduced into a communication channel, wherein the pre-distortion is based on at least one of the assessed characteristics of the channel-induced distortion in the power signal.

* * * * *